United States Patent
Vogler et al.

(10) Patent No.: US 9,073,425 B2
(45) Date of Patent: Jul. 7, 2015

(54) WHEEL HUB DRIVE SYSTEM

(75) Inventors: Tobias Vogler, Herzogenaurach (DE); Raphael Fischer, Herzogenaurach (DE); Mark Lauger, Goessweinstein (DE); Dorothee Stirnweiss, Pommersfelden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/235,977

(22) PCT Filed: Jul. 31, 2012

(86) PCT No.: PCT/EP2012/064918
§ 371 (c)(1),
(2), (4) Date: Jan. 29, 2014

(87) PCT Pub. No.: WO2013/026659
PCT Pub. Date: Feb. 28, 2013

(65) Prior Publication Data
US 2014/0152076 A1 Jun. 5, 2014

(30) Foreign Application Priority Data

Aug. 24, 2011 (DE) .......................... 10 2011 081 503

(51) Int. Cl.
| | |
|---|---|
| *B60K 1/00* | (2006.01) |
| *B60K 7/00* | (2006.01) |
| *H02K 7/14* | (2006.01) |
| *H02K 11/00* | (2006.01) |
| *F16D 49/00* | (2006.01) |
| *F16D 55/00* | (2006.01) |
| *H02K 7/00* | (2006.01) |

(52) U.S. Cl.
CPC ................ *B60K 7/0007* (2013.01); *H02K 7/14* (2013.01); *H02K 11/0073* (2013.01); *B60K 2007/0038* (2013.01); *B60K 2007/0092* (2013.01); *B60Y 2400/61* (2013.01); *F16D 49/00* (2013.01); *F16D 55/00* (2013.01); *H02K 7/006* (2013.01)

(58) Field of Classification Search
USPC ................................ 180/65.51, 301; 903/906
See application file for complete search history.

(56) References Cited

U.S. PATENT DOCUMENTS

| | | | | |
|---|---|---|---|---|
| 4,719,367 | A * | 1/1988 | Denda ........................... | 327/206 |
| 5,412,269 | A * | 5/1995 | Couture ....................... | 310/67 R |
| 7,537,096 | B2 * | 5/2009 | Arakawa et al. ............. | 188/72.1 |

FOREIGN PATENT DOCUMENTS

| | | |
|---|---|---|
| DE | 3042497 | 7/1982 |
| DE | 200 21 972 | 3/2001 |
| DE | 20021972 | 3/2001 |
| GB | 2369503 | 5/2002 |

* cited by examiner

*Primary Examiner* — John Walters
*Assistant Examiner* — James Triggs
(74) *Attorney, Agent, or Firm* — Davidson, Davidson & Kappel, LLC

(57) ABSTRACT

A wheel hub drive system with an electric motor that can be arranged inside a wheel rim, whereby the electric motor is formed by rotor that is at least indirectly joined to a wheel hub and by means of a stationary stator that can be supplied with alternating current. With an eye towards obtaining more space for the vehicle occupants, it is proposed to arrange the converter with its entire power electronics unit on the stator so that the wheel hub drive system can be operated with direct current from the battery of the vehicle, or else no alternating current lines have to be laid in the vehicle. Consequently, the alternating current is generated by the converter that is arranged in a converter housing attached axially next to the stator.

12 Claims, 2 Drawing Sheets

WHEEL HUB DRIVE SYSTEM

The invention relates to a wheel hub drive system with an electric motor that can be arranged inside a wheel rim, whereby the electric motor is formed by a rotor that is at least indirectly connected to a wheel hub and by means of a stationary stator that can be supplied with alternating current.

BACKGROUND

Wheel hub drive systems are direct drives with which the wheel is driven without transmission, for example, in the form of a gear. Instead, the rotational speed of the motor and of the driven wheel are the same at every point in time.

Electric direct drives on the basis of permanently excited synchronous motors permit a very high efficiency so that the battery of the vehicle only has to store a fraction of the energy in comparison to the energy stored in the tank of a vehicle that has an internal combustion engine.

In the past, directly driving electric motors were already integrated into the vehicle wheel, whereby the stator and the rotor of the electric motor were connected to the stationary part of the wheel bearing or of the wheel hub. This translated into a space savings compared to centrally driving electric motors that drive several wheels at the same time.

A power converter in the vehicle comprises a power electronics unit that generates a multiphase alternating current from the direct current of the vehicle's own battery and uses this current to operate the electric motor. For the sake of simplicity, this is referred to below as the converter.

A problem in this context is that, for safety reasons, a friction brake also has to be provided and consequently, it has to be integrated into the rim space of the wheel together with the electric motor, in other words, especially with its stator and its rotor.

For this purpose, European patent specification EP 1380459 B1 has already proposed a wheel hub drive system which is based on the external-rotor motor principle (the rotor surrounds the stator radially on the outside) and in which a disc brake is arranged inside the electric motor.

SUMMARY OF THE INVENTION

It is an object of the present invention to reduce the number of components in the interior of the vehicle and, at the same time, to ensure or even to improve the functionality and capability of the wheel hub drive system.

The present invention provides a wheel hub drive system of the type mentioned above in that the alternating current can be generated by a converter that is arranged in a converter housing that is attached axially next to the stator.

According to the invention, the wheel hub drive system has an electric motor that can be arranged inside a wheel rim. The electric motor is intended to be installed on the wheel bearing. For this purpose, the electric motor is arranged radially between the wheel bearing and the wheel rim.

The electric motor is formed by a rotor that is at least indirectly connected to a wheel hub and by means of a stationary stator that can be supplied with alternating current. Here, the rotor can be connected directly or indirectly to the wheel hub. If the rotor and the wheel hub are connected directly to each other, they touch each other. In the case of an indirect connected, they are connected to each other via at least one additional element such as, for example, a rotor support. Here, the connected force can be effectuated by screws or similar fastening means. As an alternative, it is possible to employ not only non-positive or positive connections, but also adhesive bonds such as, for example, weld seams.

According to the invention, the alternating current can be generated by a converter that is arranged in a converter housing that is attached axially next to the stator. The converter has the function of converting a direct current from the vehicle battery into a multiphase alternating current. Typically, a three-phase alternating current is used.

Advantageously, the stator is arranged axially between a front plate of the wheel rim and the converter housing. As an alternative to the wheel rim front plate, there can also be wheel spokes arranged axially relative to the stator, or else the wheel rim front plate can have one or more openings in order to save material or for esthetic reasons. Advantageously, in this manner, the appearance of the wheel rim can also be improved. The spokes or the wheel rim front plate are components of the wheel rim that are joined to the cylindrical rim strip.

In an advantageous embodiment, the converter housing is attached to the stator or to a first component to which the stator is also attached. It is important to arrange the stator as close as possible to the converter housing since in this manner, only a very small distance has to be bridged with a multiphase electric conductor. In this manner, the wheel hub drive has a high level of electromagnetic compatibility (EMC) since no other alternating current lines have to be laid through the vehicle. The converter housing can additionally shield the alternating current lines vis-à-vis the outside. For this purpose, the converter housing can be made partially or entirely of a metal such as, for example, aluminum.

The first component is preferably a stator plate, a brake anchor plate or a similar plate. In order to ensure the desired proximity between the stator and the converter housing, in the ideal case, the first component is used as a shared attachment. At the same time, this eliminates the need to use a second holding plate. Advantageously, the converter housing is attached to the stator plate that is provided for holding the stator.

Preferably, the converter housing is at least partially arranged radially inside the wheel rim. Ideally, it is entirely surrounded radially by the wheel rim, or by the rim strip, as a result of which a great deal of installation space is created, for example, for a control arm arrangement. Thus, the wheel hub drive is not limited only to unsteered wheels or rigid axle structures.

In an advantageous embodiment, contacts project out of the converter housing or out of a coil element of the stator and they can be plugged and/or screwed into the converter housing, or else into the coil element of the stator so as to establish electric contact. Thus, the stator and the converter housing form a plug-in connection, whereby the stator can form the plug and the converter housing can form the socket, or vice versa. This would result in an installation advantage, rendering an alternating current cable superfluous, since the contacts corresponding to the electric phases can be configured as fixed conductor ends.

Aside from the electric connection, one or more coolant lines can also be laid that lead from the converter housing to the stator, making it possible to create a shared cooling or a shared cooling circuit. A plug-in connection can be implemented in the form of lines that can be plugged into each other or in a similar manner.

The term "coil elements" refers to the component of the stator that contains or has the stationary coil windings of the electric motor. Moreover, the stator has at least one cooling element with cooling channels that carry a coolant and that are suitable for cooling the coil element.

In an advantageous embodiment, the contacts are designed in the form of pins and, when they are contacted during operation, they project through the stator plate, through the brake anchor plate or through the similar plate. Thus, the plug-in connection can also contribute to attaching or positioning the stator and the converter housing. Moreover, the contacts can be shielded by the stator and the converter housing.

Advantageously, the converter housing is rests against the coil element, against a cooling element of the stator, against the brake anchor plate, against the stator plate and/or against the similar plate.

Preferably, the brake anchor plate supports at least one component of a friction brake, especially a disc brake or drum brake. The brake anchor plate supports not only the friction brake but also the stator and the converter housing with the converter. Thus, the brake anchor plate has at least three functions.

The braking effect or the acceleration effect induces a torque into the brake anchor plate, which consequently has to be configured to be stiff so that it can absorb these torques without being plastically deformed or without being elastically deformed in such a way that damage occurs to other components of the wheel hub drive.

In an advantageous embodiment, the component of the friction brake is a brake cylinder or a brake caliper.

In the case of a drum brake, the brake anchor plate holds at least the brake cylinder and, if applicable, feed lines containing the hydraulic fluid for activating the brake. Here, the brake cylinder is arranged inside the drum and, when the hydraulic system is activated, it presses a friction surface or two friction surfaces against the inside of the drum.

In the case of a disc brake, the brake anchor plate holds at least a brake caliper that ensures that the brake shoes are pressed against the rotating disc brake.

In an advantageous embodiment, an electronic control unit is also arranged near the motor, ideally inside or partially inside the wheel rim, and this electronic control unit controls the interaction of the friction brake and the regenerative brake. In this manner, the effectiveness of the braking operation can be improved since the response times of the regenerative brake are markedly shorter because this brake does not have to make use of the primary communication via the CAN bus (controller area network).

The CAN bus makes information from each sensor available to all of the control devices, without permitting information differences between the control devices, as a result of which a longer communication time is tolerated. Consequently, due to the conventional CAN bus communication, the control signal to the friction brake is not accelerated in a special way. Thus, the regenerative brake can be activated at an earlier point in time than the friction brake, so that in the majority of cases, only a fraction of the requisite braking action has to be produced by the friction brake which is activated at a later point in time. For most braking operations, the electric motor has the necessary power to yield 100% of the necessary braking torque, but on average, 60% to 90% of the braking power is generated by the electric motor and only the remaining 10% to 40% is produced by the friction brake. As a result, the geometric size of the friction brake, especially its radial extension, can be smaller inside the electric motor, and more installation space will be available for the electric motor or for the converter.

Moreover, aside from the response times, the control quality can also be improved by the electronic control unit of the electric motor in that the electronic control unit as well as the friction brake receive the control signal via the CAN bus, but the electronic control unit of the electric motor can become active before, while and/or after the friction brake has become active.

Additional advantageous embodiments and preferred refinements of the invention can be gleaned from the description of the figures and/or from the subordinate claims.

BRIEF DESCRIPTION OF THE DRAWINGS

Below, the invention will be described in greater detail and explained on the basis of the embodiments shown in the figures.

The following is shown.

DETAILED DESCRIPTION

Figure 1:
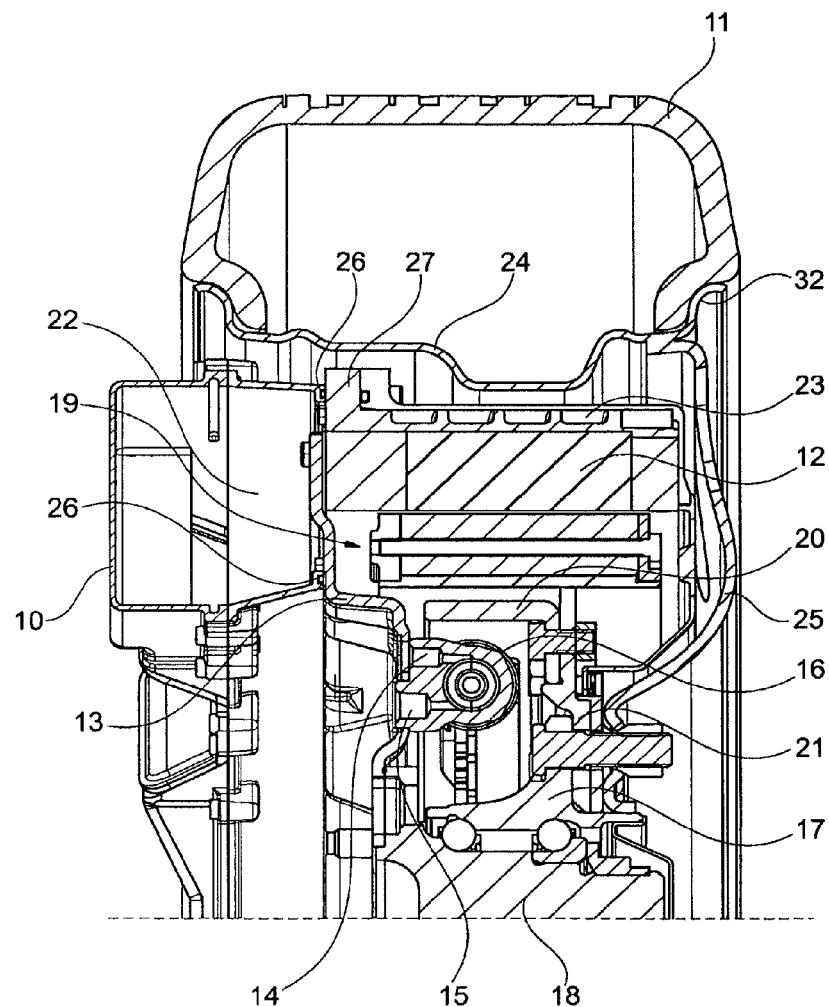
FIG. 1 a cut-away view along the drive axle of the wheel hub drive system arranged inside the wheel, and FIG. 2 a vehicle-side view of the wheel hub drive system in the vehicle wheel.

FIG. 1 shows a cut-away view along the drive axle of the wheel hub drive system arranged inside the wheel.

The wheel hub motor is arranged radially inside the wheel, whereby the tire 11 is mounted on the wheel rim 24. The wheel rim 24 is a so-called semi-full face wheel rim arrangement that provides a great deal of radial and axial motor space since the wheel rim front plate is made of steel and the almost disk-shaped wheel rim front plate is installed directly below the rim flange 32.

The stator includes a cooling element 27 with cooling channels 23 that are filled with a cooling fluid, especially water or a water-glycol mixture. Radially inside the cooling element 27, there is a coil element 12 that comprises a certain number of coils or their windings.

Since the rotor 19 is arranged radially inside the stator, the wheel hub motor is a so-called internal-rotor motor.

The stator 27, 12 is screwed onto a stator plate 13 which holds it in position so that the radial distance from the rotor 19 remains the same in the circumferential direction and during operation. The stator plate 13 is attached to the axle pivot 18 of the wheel bearing, but it also supports the brake cylinder 16 of the drum brake comprising a pressure-application connection 15 and a vent 14 for the hydraulically actuated brake cylinder 16, both of which can be accessed from the vehicle side.

Consequently, the stator plate 13 is also a brake anchor plate 13, or else it has the functions of a brake anchor plate 13. The brake cylinder 16 and also the associated brake drum 20 are arranged inside the stator and also inside the rotor 19.

The driven wheel hub 17 is driven by the rotor 19 which is moved by the changing magnetic fields of the stator. The drive force is transmitted via the rotor support 21 to the wheel hub 17.

The converter housing 10 comprises the power electronics unit (not shown here) of the converter in the interior 22. The power electronics unit is installed axially in the vicinity of the stator. For this purpose, the converter housing 10 was attached to the brake anchor plate 13 and sealed vis-à-vis the cooling element 27 and the brake anchor plate 13 by means of the gasket 26.

Advantageously, the gasket 26 is made of a conductive material or its material is covered with a conductive coating. Thus, the electromagnetic compatibility (EMC) is improved since this can improve the shielding.

Moreover, other static or dynamic gaskets can be made of the above-mentioned materials in order to improve the shielding at other places. This form of shielding has become possible since, thanks to the fact that the converter can be plugged into or screwed to the coil element 12, there is no longer a need for alternating current cable lines.

The wheel hub drive system can be provided as a wheel hub drive unit for installation on a twist-beam rear axle as well as for use in conventional control arm axles, or in individual wheel suspensions. For this purpose, only the wheel bearing and the brake anchor plate would have to be modified. For example, connections to the control arms would have to be provided on the brake anchor plate that would thus also assume the function of a wheel support.

The stator and the rotor 19 form the essential components of the permanent magnet-excited synchronous motor with an internal rotor whose power density and torque density are very high.

Figure 2:
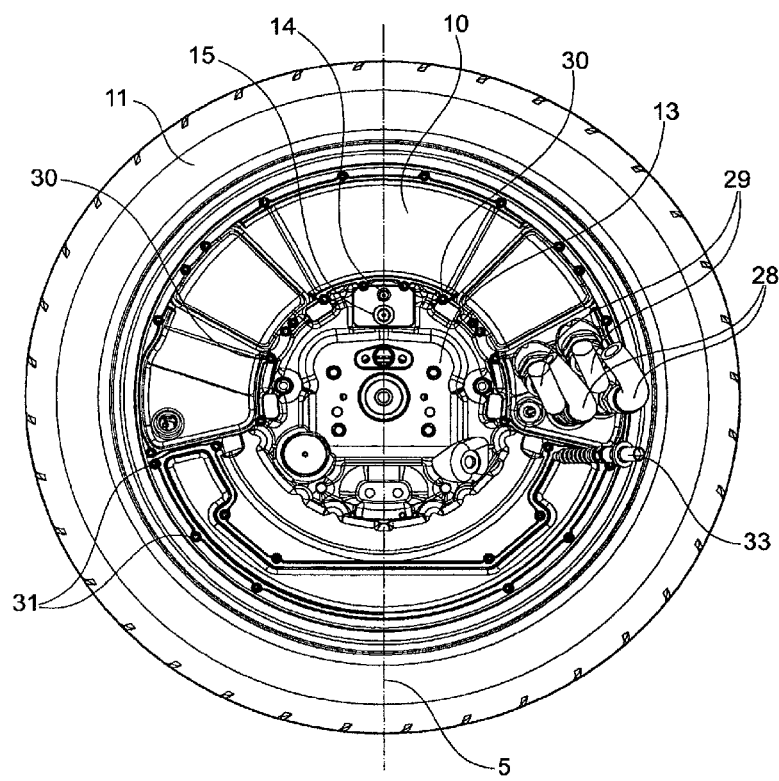

FIG. 2 shows a vehicle-side view of the wheel hub drive system in the vehicle wheel.

The view of FIG. 1 is obtained from a section along the line S.

The wheel with the wheel hub drive system is oriented in such a way that the road surface (not shown here) would be in the lower area of FIG. 2. In other words, the converter housing 10 is oriented upwards and is located radially outside of the vent 14 of the brake cylinder 16.

The converter housing 10 extends further in both circumferential directions in order to accommodate additional components such as, for example, the electronic control unit.

The wheel hub drive system is configured in such a way that the cooling connection 28, the current cable connections 29 for the direct current, for the CAN and voltage supply (12 volt) and also for the interlock circuit exit from the system as close to each other as possible. Thus, laying the cables and hoses in the vehicle is likewise very easy.

As is also the case in conventional vehicles, the brake line 15, the handbrake cable 33 and, if applicable, a cable for an independent ABS sensor all exit from the wheel hub drive system.

The torque vectoring function is possible due to the wheel-selective torque control. By the same token, if applicable, the ABS function can be at least partially taken over by the electric motor.

In summary, the invention relates to a wheel hub drive system with an electric motor that can be arranged inside a wheel rim, whereby the electric motor is formed by means of a rotor that is at least indirectly joined to a wheel hub and by means of a stationary stator that can be supplied with alternating current. With an eye towards obtaining more space for the vehicle occupants, the proposal is put forward to arrange the converter with its entire power electronics unit on the stator so that the wheel hub drive system can be operated with direct current from the battery of the vehicle, or else no alternating current lines have to be laid in the vehicle. Consequently, the alternating current is generated by the converter that is arranged in a converter housing attached axially next to the stator.

List of Reference Numerals
10 converter housing
11 tires
12 stator
13 brake anchor plate
14 vent
15 pressure-application connection
16 brake cylinder
17 wheel hub
18 axle pivot
19 rotor
20 brake drum
21 rotor support
22 interior
23 cooling channels
24 rim
25 rim front plate
26 gasket
27 cooling element
28 cooling connection
29 current cable connection
30 internal screw
31 external screw
32 rim flange
33 handbrake cable
S line

The invention claimed is:

1. A wheel hub drive system comprising:
an electric motor arrangeable inside a wheel rim, the electric motor including a rotor at least indirectly joined to a wheel hub and a stationary stator supplyable with alternating current; and
a converter for generating the alternating current and arranged in a converter housing attached axially next to the stator;
the converter housing being in contact with the coil element, with a cooling element of the stator, with the brake anchor plate, or with the stator plate.

2. The system as recited in claim 1 wherein the stator is arranged axially between a front plate of the wheel rim and the converter housing.

3. The system as recited in claim 1 wherein the converter housing is attached to the stator or to a first component, the first component being attached to the stator.

4. The system as recited in claim 3 wherein the first component is a stator plate or a brake anchor plate.

5. The system as recited in claim 1 wherein the converter housing is at least partially arranged radially inside the wheel rim.

6. The system as recited in claim 1 further comprising contacts projecting out of the converter housing or out of a coil element of the stator and pluggable or screwable into the coil element of the stator or into the converter housing so as to establish electric contact.

7. The system as recited in claim 6 wherein the contacts are designed in the form of pins and, when contacted during operation, the pins project through the stator plate or through the brake anchor plate.

8. The system as recited in claim 4 wherein the brake anchor plate supports at least one brake component of a friction brake.

9. The system as recited in claim 8 wherein the friction brake is a disc brake, an electronic wedge brake or a drum brake.

10. The system as recited in claim 8 wherein the brake component of the friction brake is a brake cylinder or a brake caliper.

11. A wheel hub drive system comprising:
an electric motor arrangeable inside a wheel rim, the electric motor including a rotor at least indirectly joined to a wheel hub and a stationary stator supplyable with alternating current;
a converter for generating the alternating current and arranged in a converter housing attached axially next to the stator; and contacts projecting out of the converter housing or out of a coil element of the stator and pluggable or screwable into the coil element of the stator or into the converter housing so as to establish electric contact.

12. The system as recited in claim 11 wherein the contacts are designed in the form of pins and, when contacted during operation, the pins project through the stator plate or through the brake anchor plate.

\* \* \* \* \*